US012064386B1

(12) United States Patent
Yan et al.

(10) Patent No.: US 12,064,386 B1
(45) Date of Patent: Aug. 20, 2024

(54) MASSAGE DEVICE

(71) Applicants: Bo Yan, Guangdong (CN); Junpeng Wu, Shenzhen (CN)

(72) Inventors: Bo Yan, Guangdong (CN); Junpeng Wu, Shenzhen (CN)

( * ) Notice: Subject to any disclaimer, the term of this patent is extended or adjusted under 35 U.S.C. 154(b) by 0 days.

(21) Appl. No.: 18/387,459

(22) Filed: Nov. 6, 2023

Related U.S. Application Data

(63) Continuation-in-part of application No. 18/372,701, filed on Sep. 26, 2023, now Pat. No. 11,957,634, which is a continuation of application No. 18/118,749, filed on Mar. 8, 2023, now Pat. No. 11,771,619.

(51) Int. Cl.
*A61H 19/00* (2006.01)

(52) U.S. Cl.
CPC ............. *A61H 19/30* (2013.01); *A61H 19/34* (2013.01); *A61H 19/44* (2013.01); *A61H 2201/1215* (2013.01); *A61H 2201/1676* (2013.01)

(58) Field of Classification Search
CPC ........ A61H 19/00; A61H 19/30; A61H 19/32; A61H 19/34; A61H 19/40; A61H 19/44; A61H 19/50; A61H 21/00; A61H 7/002; A61H 7/004; A61H 7/005; A61H 23/0263
See application file for complete search history.

(56) References Cited

U.S. PATENT DOCUMENTS 5,657,765 A * 8/1997 Est .......................... A61H 19/50 128/842
5,725,473 A * 3/1998 Taylor .................... A61H 19/34 600/38
5,843,006 A * 12/1998 Phillips .................. A61H 7/005 601/134
6,190,339 B1 * 2/2001 Imazaike ............... A61H 7/005 601/135
(Continued)

FOREIGN PATENT DOCUMENTS

CN 2699871 Y * 5/2005
CN 102429805 A 5/2012
(Continued)

OTHER PUBLICATIONS

English translation for CN 111904825, translated by espacenet.com, translated on Dec. 28, 2023.*
(Continued)

*Primary Examiner* — Tu A Vo

(57) ABSTRACT

A massage device includes a shell configured to be inserted into a vagina along an insertion direction and a first massage module mounted in the shell. A first massage portion is provided at a middle of the shell along the insertion direction. The first massage module includes a first motor and a swinging bar. The swinging bar is rotatably connected to the shell by a pivot extending along a lateral direction of the shell, one end of the swinging bar is connected to the first motor in a transmission way, and another end of the swinging bar extends into the first massage portion of the shell.
(Continued)

The swinging bar is swingable about the pivot under the driving of the first motor, and the first massage portion is swingable together with the another end of the swinging bar to slap on a vaginal wall around the shell.

11 Claims, 22 Drawing Sheets

(56) References Cited

U.S. PATENT DOCUMENTS

| | | | | |
|---|---|---|---|---|
| 6,422,993 | B1 * | 7/2002 | Hudson | A61H 19/34 600/38 |
| 9,119,765 | B2 * | 9/2015 | Topolev | A61H 19/44 |
| 9,737,457 | B2 | 8/2017 | Allen | |
| 9,889,064 | B1 * | 2/2018 | Olivares | A61H 19/40 |
| 11,229,574 | B2 | 1/2022 | Haddock et al. | |
| 11,259,987 | B1 * | 3/2022 | Chen | A61H 19/34 |
| 11,369,545 | B1 * | 6/2022 | He | A61H 7/001 |
| 11,389,374 | B1 * | 7/2022 | He | A61H 23/006 |
| 11,491,078 | B1 * | 11/2022 | He | A61H 7/005 |
| 11,826,300 | B1 * | 11/2023 | Zhou | A61H 19/34 |
| 2009/0306561 | A1 * | 12/2009 | Naganuma | A61H 39/04 601/137 |
| 2010/0160840 | A1 * | 6/2010 | Murphy | A61H 7/005 601/112 |
| 2012/0316390 | A1 * | 12/2012 | Topolev | A61H 19/30 600/38 |
| 2015/0272814 | A1 * | 10/2015 | Chen | A61H 15/0085 601/97 |
| 2016/0120737 | A1 * | 5/2016 | Sedic | A61H 19/44 601/46 |
| 2017/0367925 | A1 * | 12/2017 | Allen | A61H 19/34 |
| 2020/0085681 | A1 | 3/2020 | Haddock et al. | |
| 2022/0015983 | A1 * | 1/2022 | Li | A61H 23/0218 |
| 2022/0160577 | A1 * | 5/2022 | Cai | A61H 9/0057 |
| 2022/0257459 | A1 * | 8/2022 | Dickinson | A61H 23/0263 |
| 2022/0331198 | A1 * | 10/2022 | Dietrich | A61H 23/02 |
| 2023/0096701 | A1 * | 3/2023 | Sridhar | A61H 23/0218 600/38 |
| 2023/0346634 | A1 * | 11/2023 | Wu | A61H 23/004 |
| 2023/0355463 | A1 * | 11/2023 | Cirillo-Schmidt | A61H 23/0263 |
| 2024/0108538 | A1 * | 4/2024 | Chen | A61H 23/0254 |

FOREIGN PATENT DOCUMENTS

| | | | | | |
|---|---|---|---|---|---|
| CN | 103393530 | A | | 11/2013 | |
| CN | 204890546 | U | | 12/2015 | |
| CN | 111419660 | A | | 7/2020 | |
| CN | 111904825 | A | * | 11/2020 | A61H 19/44 |
| CN | 217409236 | U | | 9/2022 | |
| EP | 3925588 | | | 12/2021 | |
| EP | 3925588 | A1 | * | 12/2021 | A61H 19/30 |
| EP | 3925588 | A1 | | 12/2021 | |
| IT | 20100010 | A1 | | 10/2011 | |
| JP | 2006110289 | A | * | 4/2006 | A61H 19/40 |
| KR | 20180001751 | | | 6/2018 | |
| RU | 2742137 | | | 2/2021 | |
| WO | 2015096179 | | | 7/2015 | |
| WO | 2016103100 | | | 6/2016 | |

OTHER PUBLICATIONS

Office Action dated Feb. 5, 2024 for corresponding Russia Application No. 2023131322 along its English Translation.

Extended European Search Report Dated May 7, 2024 for corresponding European Application No. 23211161.7.

* cited by examiner

MASSAGE DEVICE

CROSS-REFERENCE TO RELATED APPLICATIONS

This application is a continuation-in-part application of application Ser. No. 18/372,701, filed on Sep. 26, 2023, which is a continuation application of application Ser. No. 18/118,749, filed on Mar. 8, 2023, now U.S. Pat. No. 11,771,619, which claims priority to Chinese Patent Application No. 202310081620.1, filed on Jan. 17, 2023, and Chinese Patent Application No. 202310193022.3, filed on Feb. 28, 2023. The content of the aforementioned application, including any intervening amendments thereto, are incorporated herein by reference.

TECHNICAL FIELD

The present application relates to the technical field of massage devices, and in particular to a massage device with a swinging first massage portion.

BACKGROUND

With the development of society and economy, the pace of life is getting faster and faster, and the pressure of work is getting higher and higher. Thus, the demand for physical relaxation is increasing, and consumer-grade massage device is becoming popular.

The massage device in the related art generally includes motor and a massage head driven by the motor. During operation, the massage head does linear reciprocating motion to hit a part of the human body that needs to be massaged, such as the waist, the neck and the like. Such massage device is relatively simple in actions, and the massage head thereof is subject to the resistance of the massaged part of the human body during operation, so it is difficult to play good massage effect and accordingly the massage experience is not ideal.

SUMMARY

An object of the present application is to provide a massage device that is capable of playing good massage effect even under the resistance of the massaged part, thereby improving the massage experience.

In order to achieve the above object, a technical solution of the present application provides a massage device, including:

- a shell configured to be inserted into a vagina along an insertion direction, a first massage portion being provided at a middle of the shell along the insertion direction; and
- a first massage module mounted in the shell, and including a first motor and a swinging bar driven by the first motor, the swinging bar being rotatably connected to the shell by a pivot extending along a lateral direction of the shell, one end of the swinging bar being connected to the first motor in a transmission way, and another end of the swinging bar extending into the first massage portion of the shell,
- wherein the swinging bar is swingable about the pivot under the driving of the first motor, and the first massage portion is swingable together with the another end of the swinging bar to slap on a vaginal wall around the shell.

Compared with the prior art, the massage device according to the embodiment of this invention drives the first massage portion to swing about the pivot, thereby the massage head slapping on a massaged part around the shell and thus playing good massage effect, improving the massage experience of the users.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

Figure 1:
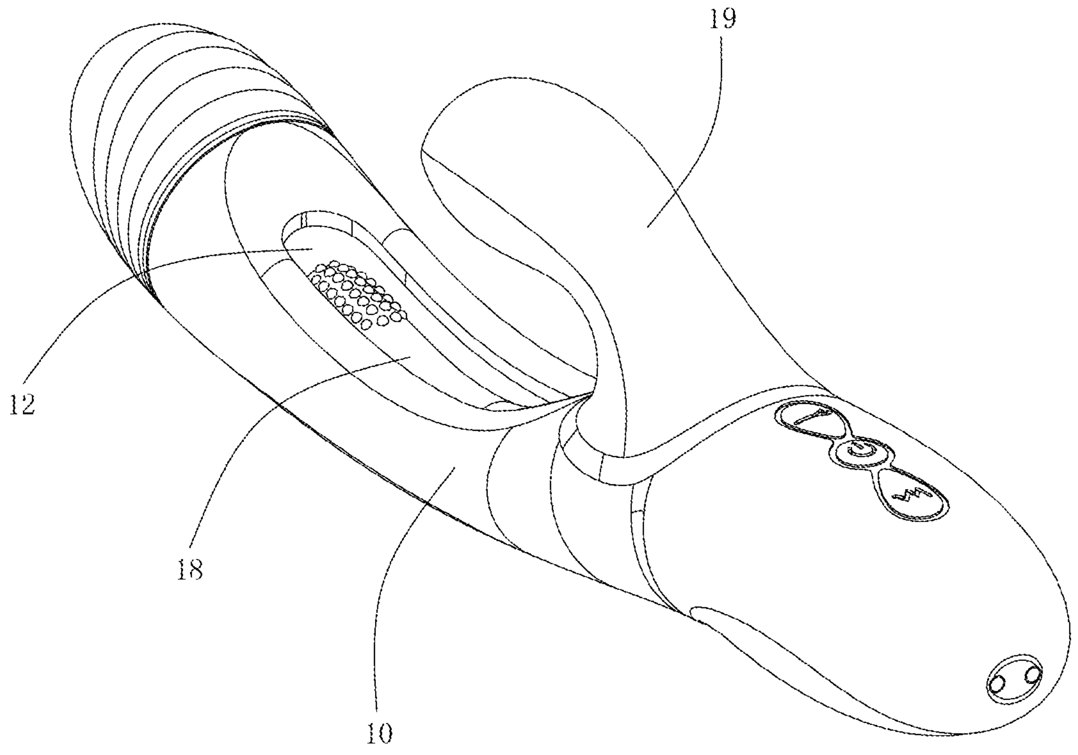
FIG. 1 is an isometric, assembled view of a massage device according to an embodiment of the present application.

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIG. 1 to FIG. 4, a massage device according an embodiment of the present application is shown. The massage device includes a shell 10 and a first massage module 20 mounted in the shell 10.

The shell 10 is elongated, and a first massage portion 18 is provided at a middle of the shell 10. In this embodiment, a moving space 12 is defined in the shell 10 and preferably extends through the shell 10 to communicate with an outside environment. The first massage portion 18 extends into the moving space 12, and is swingable relative to the shell 10 under the action of the first massage module 20. During swinging of the first massage portion 18, a portion of the first massage portion 18 is capable of extending beyond the moving space 12 of the shell 10 to the outside environment, so as to slap on a corresponding part of the human body out of and adjacent to the middle of the shell 10.

The massage device according to this embodiment defines the moving space 12 in the shell 10, the first massage portion 18 extends into the moving space 12, and the first massage module 20 makes the first massage portion 18 move relative to the shell 10 in the form of swinging, so that at least a portion of the first massage portion 18, particularly a free end of the first massage portion 18 swings beyond the moving space 12 of the shell 10 to slap on the corresponding part of the human body around the shell 10, thereby performing massage to the human body.

The design of the moving space 12 in the shell 10 provides sufficient space for the swinging of the first massage portion 18, and thus the massage device is capable of generating strong force to the massaged part even under the resistance of the massaged part, thereby playing good massage effect. Preferably, the first massage portion 18 is elastic and capable of generating deformation when it attaches to the massaged part, so that a shape of the first massage portion 18 after deformed matches with the shape of the massaged part. In this way, a contact area of the first massage portion 18 and the massaged part is enlarged, and thus the massage effect is further improved.

In some embodiments, the whole first massage portion 18 may be made of soft materials, such as silica, rubber and the like. In some embodiments, only an outer portion of the first massage portion 18 for slapping on the massaged part of the human body is made of soft materials.

Figure 4:
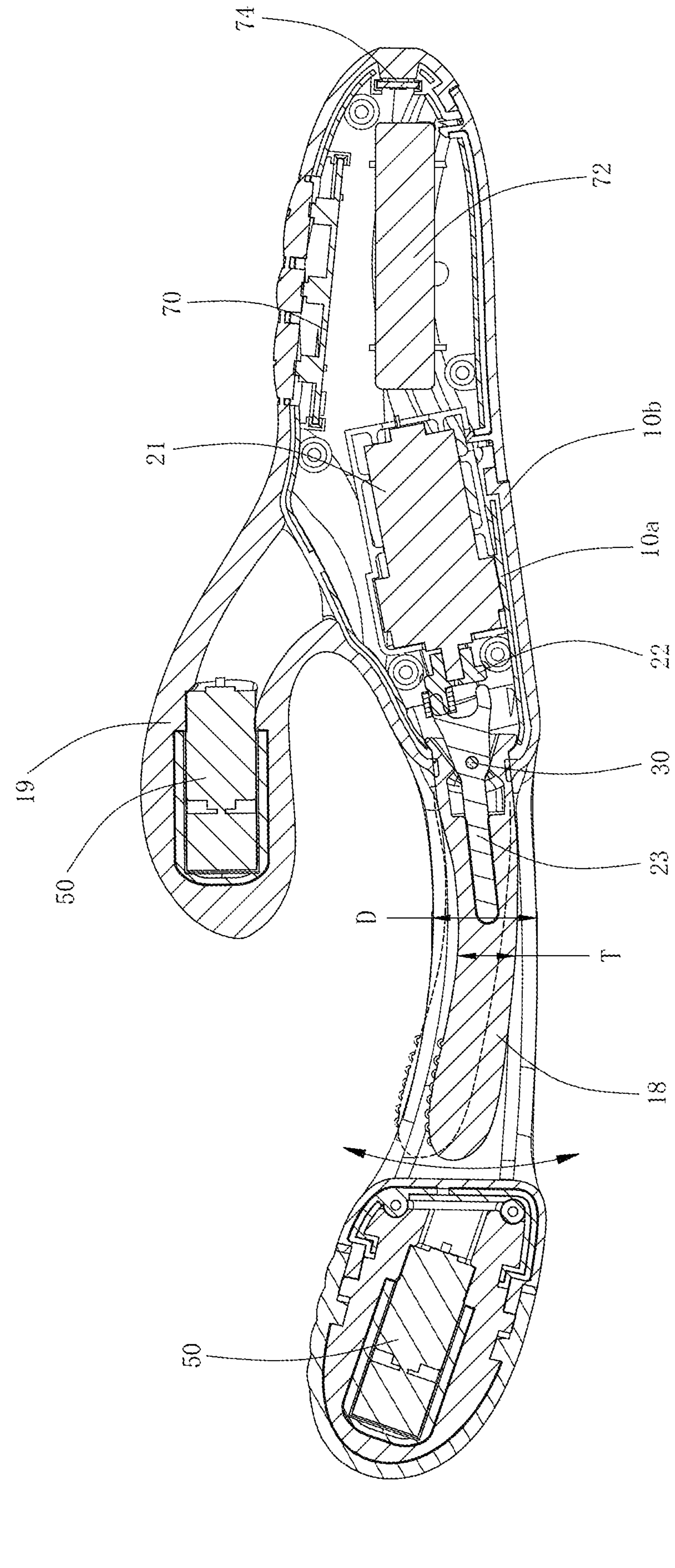
FIG. 4 is a cross sectional view of the massage device taken along ling IV-IV of FIG. 3.

As shown in FIG. 4, the first massage portion 18 swings in the moving space 12 along the depth direction to up and down in the moving space 12. Preferably, the thickness T of the first massage portion 18 is less than the depth D of the moving space 12/the thickness of the shell 10, and the first massage portion 18 is completely received in the moving space 12 when it is not work. The thickness difference of the first massage portion 18 and the shell 10 provides a space therebetween along a swinging direction of the first massage portion 18, thus the first massage portion 18 is capable of swinging even the massaged part is nestled to the outer surface of the shell 10, thereby ensuring the massage experience.

In this embodiment, the first massage portion 18 is generally elongated and column-shaped. The thickness T of the first massage portion 18 is preferably 1 mm~150 mm, the width of the first massage portion 18 is preferably 1 mm~150 mm, and the length of the first massage portion 18 is preferably 5~150 mm, so as to make the touching area of the first massage portion 18 appropriate when it hit the massaged part. One end of the first massage portion 18 is integrally connected to the shell 10, and another end of the first massage portion 18 is free and configured as a massage head 181, swinging out of the moving space 12 to slap on the massaged part of the human body.

Preferably, a plurality of bulges 183 are formed on the outer surface of the massage head 181 of the first massage portion 18 for improving stimulation to the massaged part. Alternately, the bulges 183 may be formed on the entire outer surface of the first massage portion 18. Preferably, the bulges 183 are integrally formed with the first massage portion 18, for example by injection molding. Alternately, the bulges 183 may be formed separately and then assembled to the first massage portion 18 by bonding.

Figure 3:
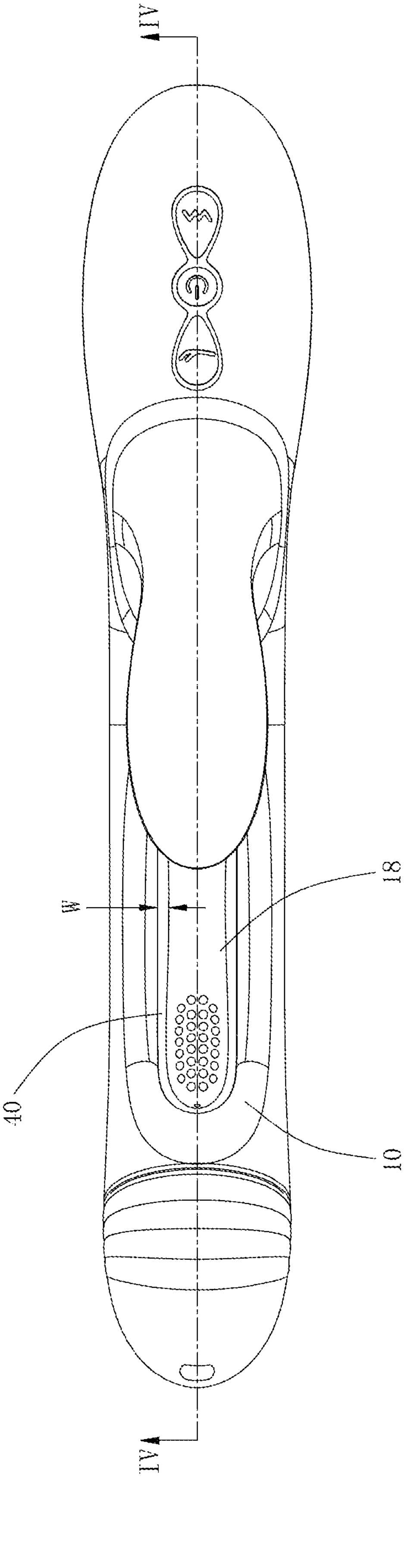
FIG. 3 is a top plane view of the massage device of FIG. 1.

As shown in FIG. 3, the first massage portion 18 is less than the moving space 12 of the shell 10 in lateral dimensions, and a gap 40 is defined between an outer surface of the first massage portion 18 and an inner surface of the shell 10 surrounding the moving space 12. The gap 40 makes the swinging of the first massage portion 18 in the moving space 12 not interfere with the shell 10. On the one side, the width W of the gap 40 is designed to be not less than 0.5 mm to ensure that the first massage portion 18 swings freely in the moving space 12, and on the other hand, the width W of the gap 40 is designed to be less than 100 mm to avoid wasting space and reduce the entire dimensions of the massage device. In specific embodiments, the width W of the gap 40 may be 0.5 mm, 1.5 mm, 3 mm, . . . , 50 mm, . . . , 99 mm or 100 mm.

In this embodiment, the moving space 12 has a shape similar to that of the first massage portion 18. The width W of the gap 40 between the outer surface of the first massage portion 18 and the inner surface of the shell 10 is substantially constant along a circumferential direction. Specifically, the moving space 12 is generally race-track shaped. The inner surface of the shell 10 is continuous along the circumferential direction, and the moving space 12 is closed circumferentially.

In this embodiment, the moving space 12 is a through hole extending through two opposite sides (top and bottom sides as viewed from FIG. 2) of the shell 10 along a swinging direction of the first massage portion 18. In this case, the depth D of the moving space 12 is the same as the thickness of the shell 10, preferably ranges from 1 mm to 100 mm. During operation, the first massage portion 18 swings along the depth direction of the moving space 12, which can not only swing upwardly to the upper outside of the shell 10, but also swing downwardly to the lower outside of the shell 10. That is, the first massage portion 18 is capably of slapping on two different parts of the human body which are located at two opposite sides of the shell 10 at the same time, which is more suitable for use in the human body to massage the cavity wall, such as the vagina wall.

In other embodiments, the moving space 12 may be a blind hole extending through only one side, such as the top side or the bottom side of the shell 10. In this situation, the depth D of the moving space 12 is less than the thickness of the shell 10. The massage device with the blind hole is more suitable for massaging the body surface, such as the waist, the neck and the like. It should be noted that the massage device with the blind hole may also be used for massaging the cavity of the human body, and the massage device with the through hole may also be used for massaging the body surface.

In other embodiments, as shown in FIG. 5*a* to FIG. 6*d*, the moving space 12 may have a shape different from that of the first massage portion 18, and thus the width W of the gap 40 may be variable along the circumferential direction.

Figure 5A:
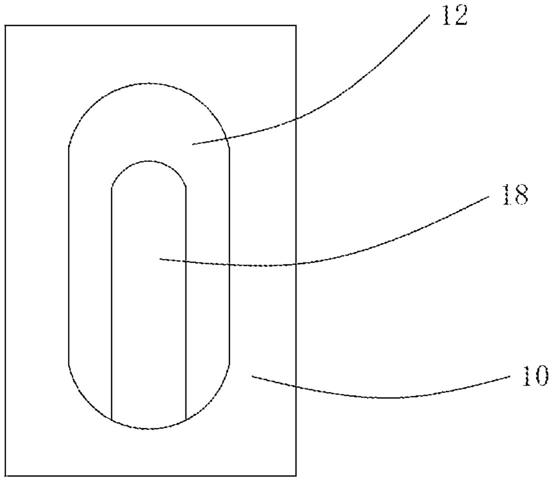
FIG. 5*a* is a schematic view of a moving space of the massage device.
Figure 5B:
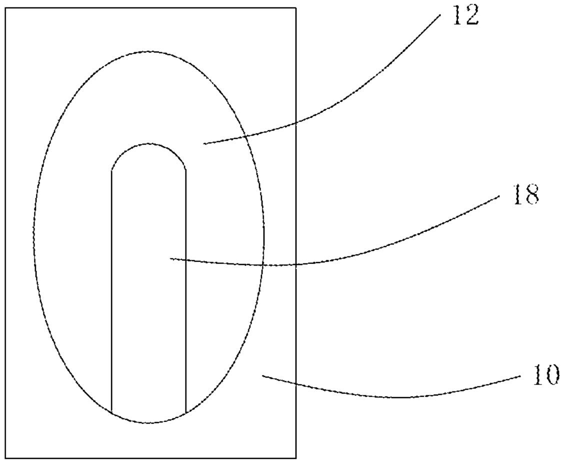
FIG. 5*b* shows a second embodiment of the moving space.
Figure 5C:
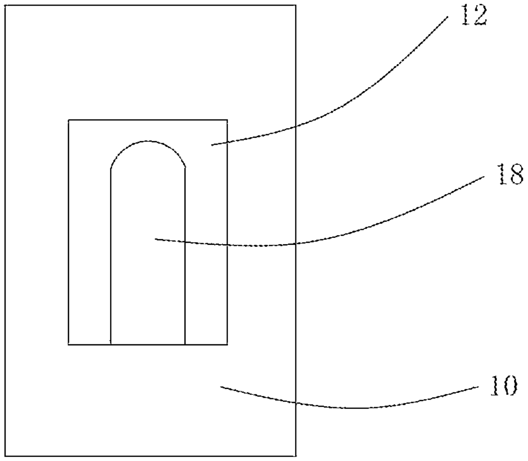
FIG. 5*c* shows a third embodiment of the moving space.
Figure 5D:
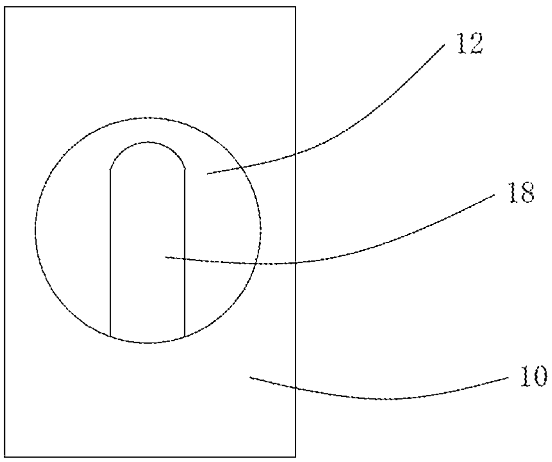
FIG. 5*d* shows a fourth embodiment of the moving space.
Figure 5E:
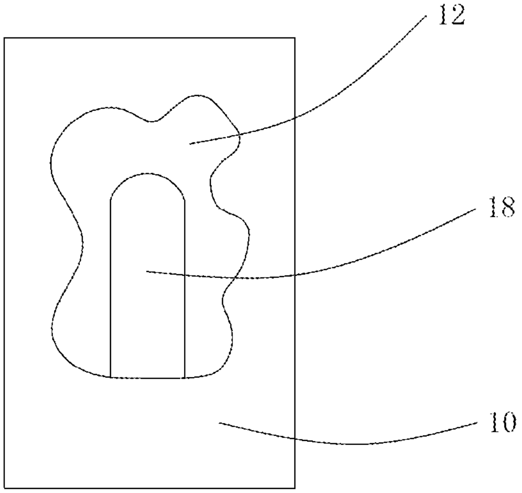
FIG. 5*e* shows a fifth embodiment of the moving space.
Figure 5F:
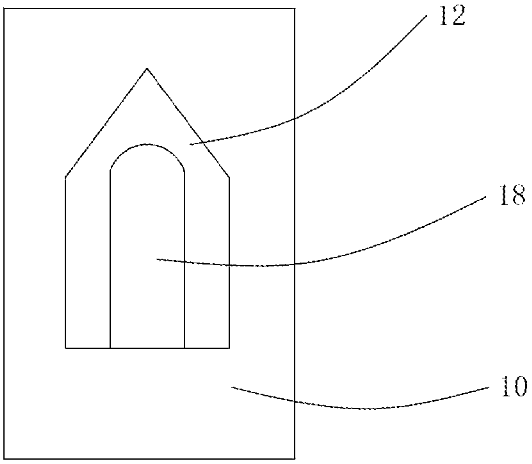
FIG. 5*f* shows a sixth embodiment of the moving space.

The shape of the moving space 12 may be regular or irregular, specifically may be any one of circle, semicircle, ellipse, square, rectangle, triangle, polygon, D-shape, C-shaped, kidney-shaped, heart-shaped, gourd-shaped, briolette, and etc., or may be a combination of at least two of them. For example, the moving space 12 shown in FIG. 5*a* is generally kidney-shaped, the moving space 12 shown in FIG. 5*b* is generally elliptical, the moving space 12 shown in FIG. 5*c* is generally rectangular, the moving space 12 shown in FIG. 5*d* is generally circular, the moving space 12 shown in FIG. 5*e* is generally irregular, the moving space 12 shown in FIG. 5*f* is generally a combination of a triangle and a rectangle. It should be understood that the shape of the moving space 12 may be set according to needs, which is not limited to the embodiments.

Figure 5G:
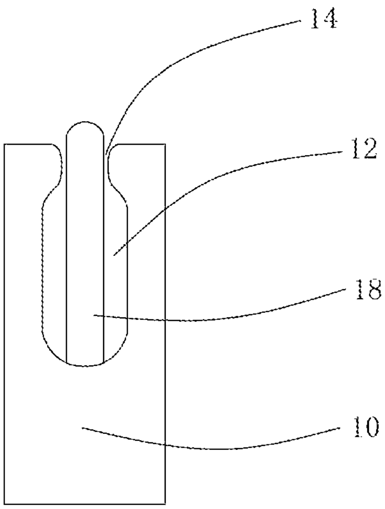
FIG. 5*g* shows a seventh embodiment of the moving space.
Figure 5H:
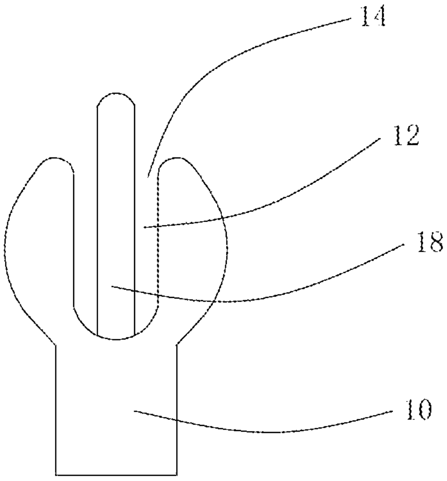
FIG. 5*h* shows an eighth embodiment of the moving space.

Further, the moving space 12 may be open in the circumferential direction. That is, the inner surface of the shell 10 surrounding the moving space 12 is discontinuous along the circumferential direction. As shown in FIGS. 5*g* and 5*h*, a circumferential opening 14 is defined in the shell 10 and communicates with the moving space 12. The circumferential opening 14 is aligned with the massage head 181 along the longitudinal direction of the first massage portion 18, and the massage head 181 extends out of the moving space 12 through the circumferential opening 14. In this case, not only the top and/or bottom sides, but also the massage head 181 of the first massage portion 18 are capable of hitting corresponding parts of the human body, which means that the area being massaged at the same time is further increased.

Figure 5I:
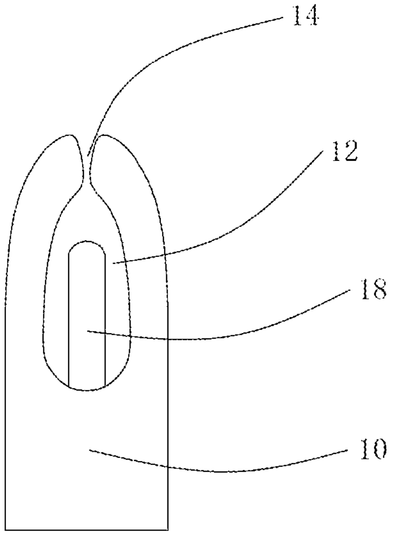
FIG. 5*i* shows a ninth embodiment of the moving space.
Figure 5J:
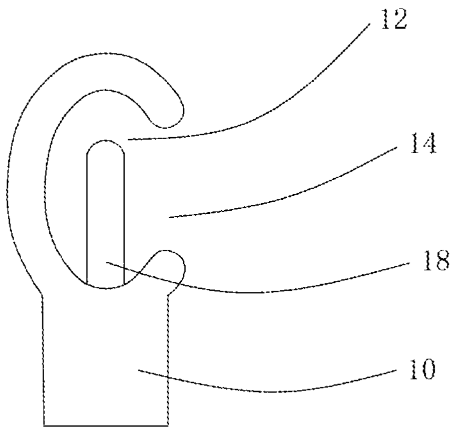
FIG. 5*j* shows a tenth embodiment of the moving space.

Alternately, the entire first massage portion 18 may be accommodated in the moving space 12 even the moving space 12 is open circumferentially. FIG. 5*i* shows that the moving space 12 is generally briolette and open circumferentially, whilst the entire first massage portion 18 is in the moving space 12. In addition, the first massage portion 18 accommodated in the moving space 12 may be deviated from the circumferential opening 14. FIG. 5*i* shows that the moving space 12 is generally C-shaped, and the first massage portion 18 is generally column-shaped and arranged parallel to the circumferential opening 14 of the moving space 12.

Figure 6A:
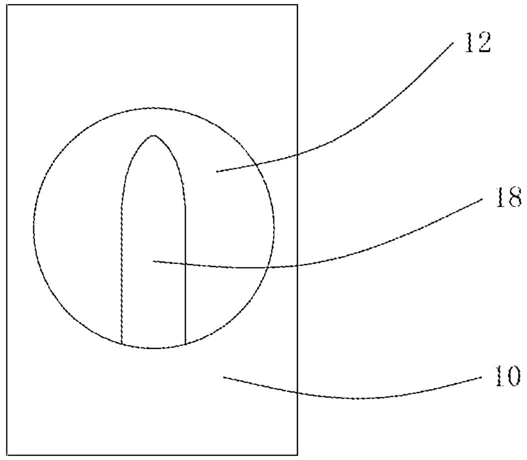
FIG. 6*a* shows a second embodiment of a first massage portion of the massage device.
Figure 6B:
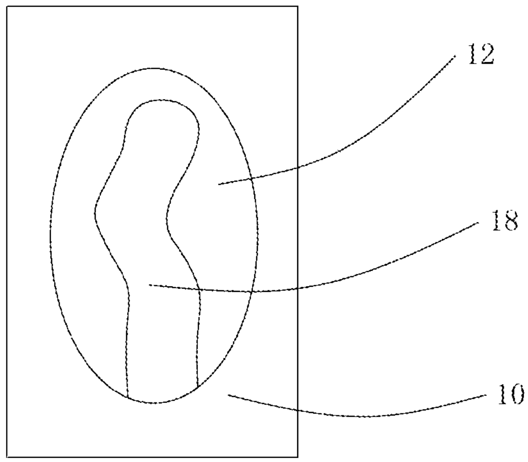
FIG. 6*b* shows a third embodiment of the first massage portion.
Figure 6C:
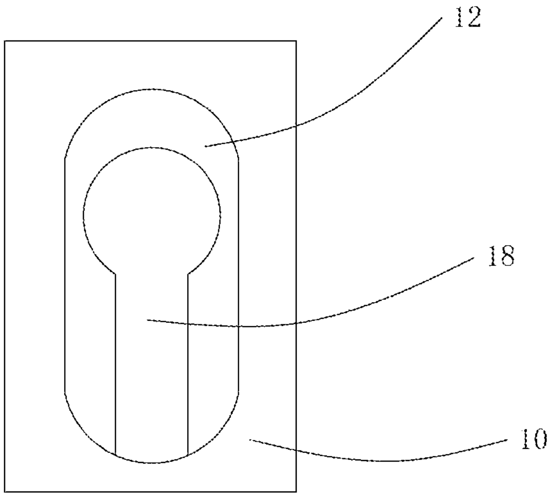
FIG. 6*c* shows a fourth embodiment of the first massage portion.
Figure 6D:
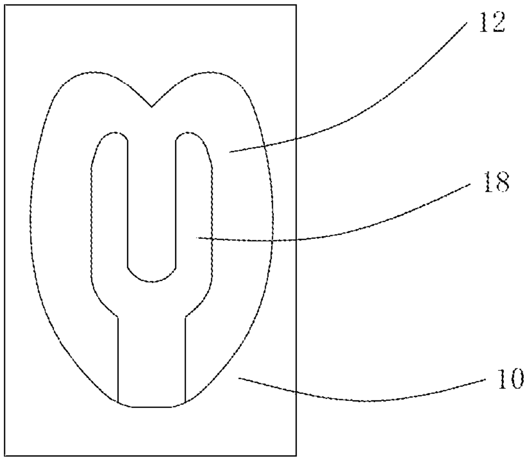
FIG. 6*d* shows a fifth embodiment of the first massage portion.

The shape of the first massage portion 18 may be regular or irregular, specifically may be any one of circle, semicircle, ellipse, square, rectangle, triangle, polygon, D-shape, C-shaped, kidney-shaped, heart-shaped, gourd-shaped, second massage portion-shaped, and etc., or may be a combination of at least two of them. For example, the first massage portion 18 shown in FIG. 6*a* is generally column-shaped with the massage head 181 thereof being rounded, the first massage portion 18 shown in FIG. 6*b* is generally irregular, the first massage portion 18 shown in FIG. 6*c* is generally a combination of a column and a circle, and the first massage portion 18 shown in FIG. 6*d* is generally second massage portion-shaped. It should be understood that the shape of the first massage portion 18 may be set according to needs, which is not limited to the embodiments.

The shape of the first massage portion 18 and the shape of the moving space 12 can be selected arbitrarily, as long as the first massage portion 18 is movable in the moving space 12. FIGS. 5*a*-5*j* show the moving spaces 12 of different shapes with the same first massage portion 18, FIGS. 6*a*-6*d* show the moving spaces 12 of different shapes with the first massage portion 18 of different shapes. It should be noted that the present application does not impose any restrictions on the shapes of the moving space 12 and first massage portion 18, and does not impose any restrictions on the combination of the shapes of the moving space 12 and first massage portion 18.

Preferably, the moving space 12 in the middle of the shell 10 is closed circumferentially, and the shell 10 forms two supporting arms 16 at two opposite lateral sides (i.e., left and right sides) of the moving space 12. The supporting arms 16 enhance the strength of the shell 10 and thus can provide effective support for the first massage portion 18 even it swings rapidly and/or greatly. Preferably, the width of the supporting arm 16 ranges from 1 mm to 150 mm, which is conducive to the miniaturization of the massage device, particularly miniaturization of the diameter of the massage device, so that the massage device can be used for massage of narrow and small parts, such as the cavity of the human body.

In some embodiments, as shown in FIGS. 6*a*-6*d*, the moving space 12 may be defined at an end portion of the shell 10. In this case, the moving space 12 may be closed in the circumferential direction or be open in the circumferential direction.

The shell 10 may be designed to have an outer profile according to its application scenarios. When the massage device is used in the human body, the shell 10 may be shaped as the cavity of the human body, for example shaped as the vagina, as shown in FIGS. 1-4. When the massage device is used out of the human body, the shell 10 may be any shape, such as column-shaped, block-shaped, disc-shaped, second massage portion-shaped, and etc.

In some embodiments, the shell 10 may be provided with a handle for holding, thereby facilitating the users to place the massage device onto any part of the human body. Alternately, the shell 10 may be provided with a wearable member, such as a telescopic belt, a bandage with a buckle, and the like. The whole massage device can be worn to the neck, the waist, the arm, the leg, and etc. through the wearable member, thereby freeing hands of the users.

Figure 2:
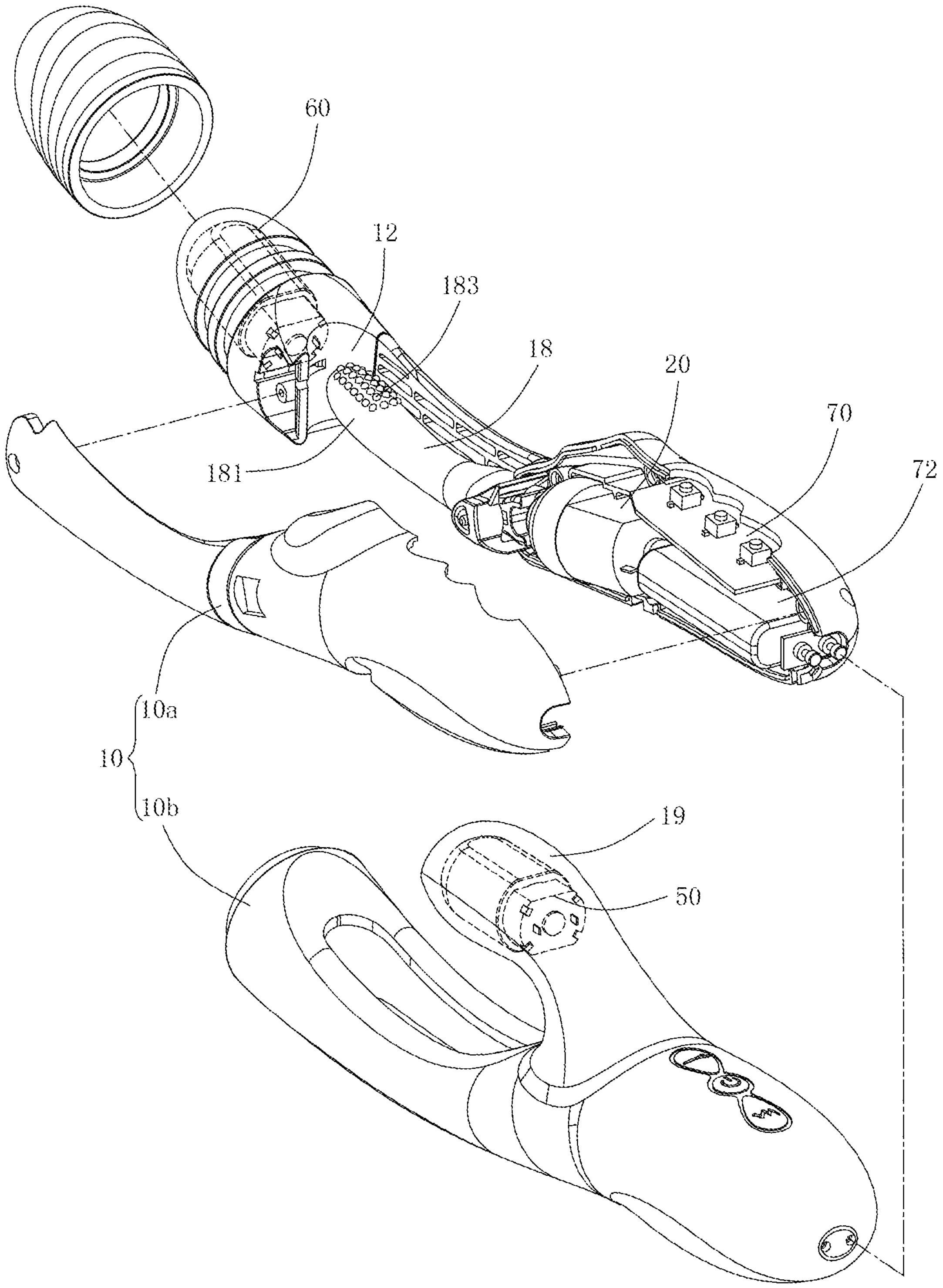
FIG. 2 is an isometric, exploded view of the massage device of FIG. 1.

As shown in FIG. 2, in this embodiment, the shell 10 is a double-layer structure, and includes an inner shell 10*a* and an outer shell 10*b* covering the whole inner shell 10*a*. The inner shell 10*a* is made of hard materials, such as plastic, metal, wood, and etc. The outer shell 10*b* is made of soft materials, such as silicone, rubber, and etc., and the first massage portion 18 extends integrally from the outer shell 10*b*. The inner shell 10*a* inside the outer shell 10*b* not only provides support for the outer shell 10*b*, but also provides a receiving space for mounting the first massage module 20. The outer shell 10*b*, which is used to touch the massaged part directly, preferably has a smooth outer surface, thereby the massage device in whole has high strength and comfortable use experience.

In this embodiment, the inner shell 10*a* is formed by injection molding as two pieces and then assembly together by snap-fitting, screws, and etc., which facilitates assembly of the elements inside the shell 10, such as the first massage module 20. The outer shell 10*b* is formed by 2nd injection molding as one piece and covering the inner shell 10*a* after the inner shell 10*a* and the elements inside the inner shell 10*a* are assembled together. The integral outer shell 10*b* is beneficial to the waterproof and dustproof of the present message device, so that the message device can be used underwater or in the cavity of the human body.

In other embodiments, the inner shell 10*a* may be molded as one piece. In this case, elements mounted inside the inner shell 10*a* are arranged in the mold and then injects the inner shell 10*a*. Alternately, the outer shell 10*b* may be molded as two or more pieces and then assembled together. In this case, the shell 10 is detachable for replacing elements therein, which is good for maintenance of the massage device. The inner shell 10*a* may be the same as the outer shell 10*b*, and thus the shell 10 has two different layers in any positions. Alternately, the inner shell 10*a* may be different from the outer shell 10*b* in local areas, and thus the local areas of the shell 10 may be one layer, i.e., without the layer of the hard inner shell 10*a*.

Preferably, the moving space 12 is defined at a position of the hard outer shell 10*b* with the soft inner shell 10*a* formed therein, thus the solid portion surrounding the moving space 12 is constructed of two layers and the strength thereof is high enough to support the swinging of the first massage portion 18. It should be understood that: in some cases where the requirements for the use environment are not high, the moving space 12 may be formed at a position of the outer shell 10*b* without the inner shell 10*a* formed therein. In other embodiments, the shell 10 may be a single-layer structure with certain hardness.

Figure 7:
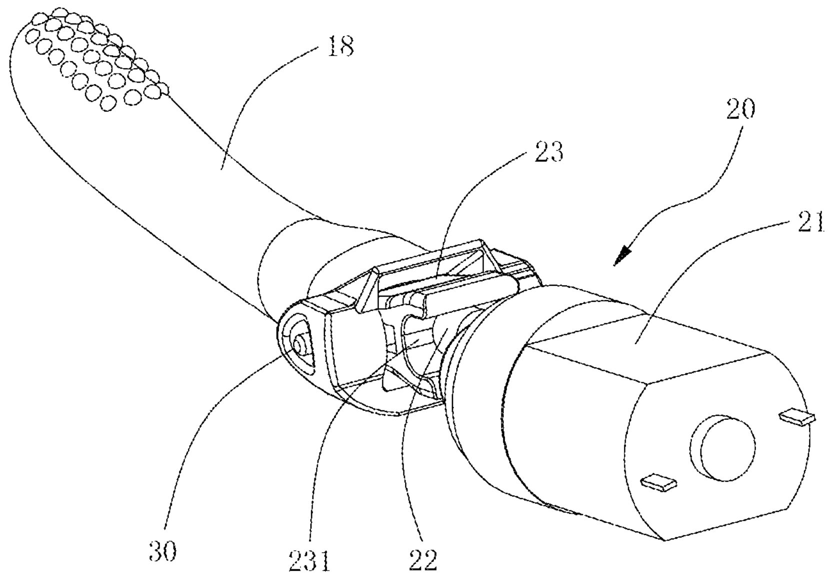
FIG. 7 is an isometric, assembled view of a first massage module of the massage device of FIG. 1.
Figure 8:
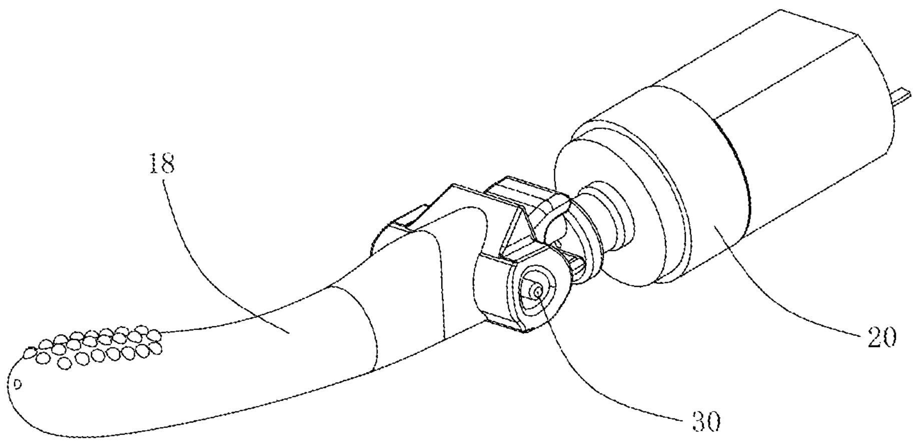
FIG. 8 shows the first massage module of FIG. 7 from another aspect.
Figure 9:
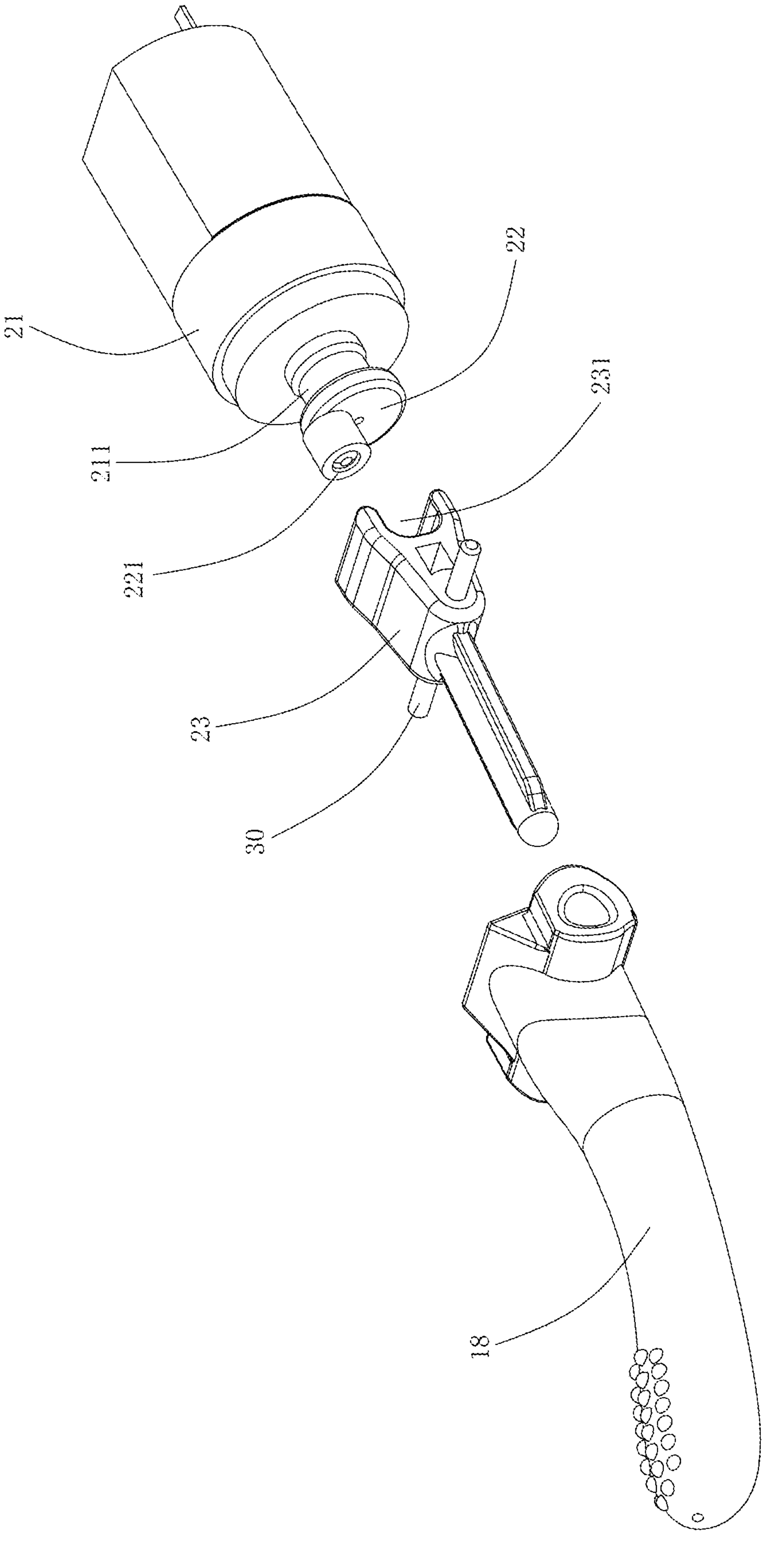
FIG. 9 is an exploded view of the first massage module of FIG. 8.

Referring to FIGS. 7-9, the first massage module 20 is used to drive the first massage portion 18 to swing relative to the shell 10, and includes a first motor 21, preferably a rotary motor, a swinging bar 23 and a transmission member 22 arranged between the first motor 21 and the swinging bar 23. The transmission member 22 may be gear mechanism, pulley mechanism, crank mechanism, cam mechanism, turbine mechanism, and etc., which not only transmits power from the first motor 21 to the swinging bar 23, but also change the movement mode therebetween, such as change the rotation of the first motor 21 to the swinging of the swinging bar 23.

In this embodiment, the transmission member 22 is an eccentric wheel. A rotary shaft 211 of the first motor 21 is connected to a central portion of the eccentric wheel 22, and a driving rod 221 extends out from a periphery of the eccentric wheel 22 to connect the swinging bar 23. Both the rotary shaft 211 and driving rod 221 extend generally parallel to the longitudinal direction of the shell 10, but the driving rod 221 is eccentric with respect to the rotary shaft 211. During rotation of the eccentric wheel 22 along with the rotary shaft 211, the driving rod 221 revolves around the rotary shaft 211 to generate movement along both the thickness direction and the width direction of the shell 10.

In this embodiment, the swinging bar 23 is rotatably connected to the shell 10, preferably to the inner shell 10*a* by a pivot 30. One end of the swinging bar 23 is connected to the driving rod 221 of the eccentric wheel 22, and another end of the swinging bar 23 extends into the first massage portion 18 of the shell 10. The pivot 30 is arranged adjacent to the end of the swinging bar 23 connected to the driving rod 221, thereby the another end of the swinging bar 23 and the first massage portion 18 mounted around the another end of the swinging bar 23 have a greater swing amplitude.

Preferably, the first massage portion 18 extends from the shell 10 at a position adjacent to a connecting portion of the swinging bar 23 and the shell 10, and thus the entire first massage portion 18 is constructed as a single pendulum, and the massage head 181 may obtain a big swing amplitude even the swing angle of the first massage portion 18 is small.

Preferably, the swinging bar 23 has a length not less than a half of the first massage portion 18. That is, the swinging bar 23 at least extends to a middle portion of the first massage portion 18, providing sufficient support for the first massage portion 18 and being conducive to driving the massage head 181 of the first massage portion 18 to swing.

In this embodiment, the swinging bar 23 defines a sliding groove 231 at the one end thereof for receiving the driving rod 221, and the sliding groove 231 is configured that movement of the driving rod 221 along the thickness direction is limited, while movement of the driving rod 221 along the width direction is allowed. For example, a size of the sliding groove 231 in the width direction is much larger than the diameter of the driving rod 221, and a size of the sliding groove 231 in the thickness direction is equal to or slightly larger than the diameter of the driving rod 221. In this way, the driving rod 221 is capable of driving the swinging bar 23 to move upwardly and downwardly, in turn driving the swinging bar 23 to swing along the thickness direction to the outside environment.

In other embodiments, the first motor 21 and the swinging bar 23 may be connected in a transmission way but in a manner of non-contact, thereby omitting the transmission member 22. For example, the first motor 21 may be in the form of an electromagnet, and the swinging bar 23 is connected to the first motor 21 by magnetic force. The polarity of the electromagnet is changed according to the current directions applied to first motor 21, making the magnetic force between the first motor 21 and the swinging bar 23 attract or repel each other, thus realizing the swing action of the swinging bar 23.

Referring to FIGS. 2 and 4, the massage device further includes a second massage module 50, which includes at least a vibration motor. In this embodiment, the vibration motor 50 is arranged in a second massage portion 19 of the shell 10 which extends curvedly from a rear end of the moving space 12 of the shell 10 to an upper side of the first massage portion 18. When the massage device is used, for example, in the vaginal of the human body, the first massage module 20 drives the first massage portion 18 to slap on the vaginal wall, the vibration motor 50 in the second massage portion 19 generates vibration effect to the clitoris, which can multiply the stimulation effect to the users.

The massage device may further include a third massage module 60, which includes at least a vibration motor. In this embodiment, the vibration motor 60 is arranged in the front end of the shell 10 for generating vibration effect. When the massage device is used in the vagina, the first massage module 20 drives the first massage portion 18 to slap on the vaginal wall, the vibration motor 50 in the second massage portion 19 generates vibration effect to the clitoris, and the vibration motor 60 in the front end of the shell 10 generates vibration effect to the vaginal wall, which can further multiply the stimulation effect to the users.

Referring to FIGS. 2 and 4 again, the massage device may further include a control member 70, such as a control circuit board mounted in the shell 10. The control member 70 is electrically connected to the first motor 21 and the vibration motors 50, 60 for controlling their operation according to the user's instructions, such as controlling the frequency of the vibration motors 50, 60, controlling the rotary speed of the first motor 21, and etc.

Preferably, a battery 72 is arranged in the shell 10 and connected to the circuit board 70 electrically. The battery 73 supplies electric power to the motors 21, 50, 60 through the circuit board 70. Preferably, the battery 72 is a rechargeable battery, and a corresponding charging interface 74 may be provided at a rear end of the shell 10 to connect external power supply to charge the battery 72, as shown in FIG. 4.

The massage device according to this embodiment defines the moving space 12 in the shell 10 for providing sufficient space for the swinging of the first massage portion 18, so that the massage device is capable of generating strong force to the massaged part even under the resistance of the massaged part, thereby playing good massage effect. Further, the present massage device is provided with vibration motors 50, 60 for generating high high-frequency vibration, further improving the massage effect.

Figure 10:
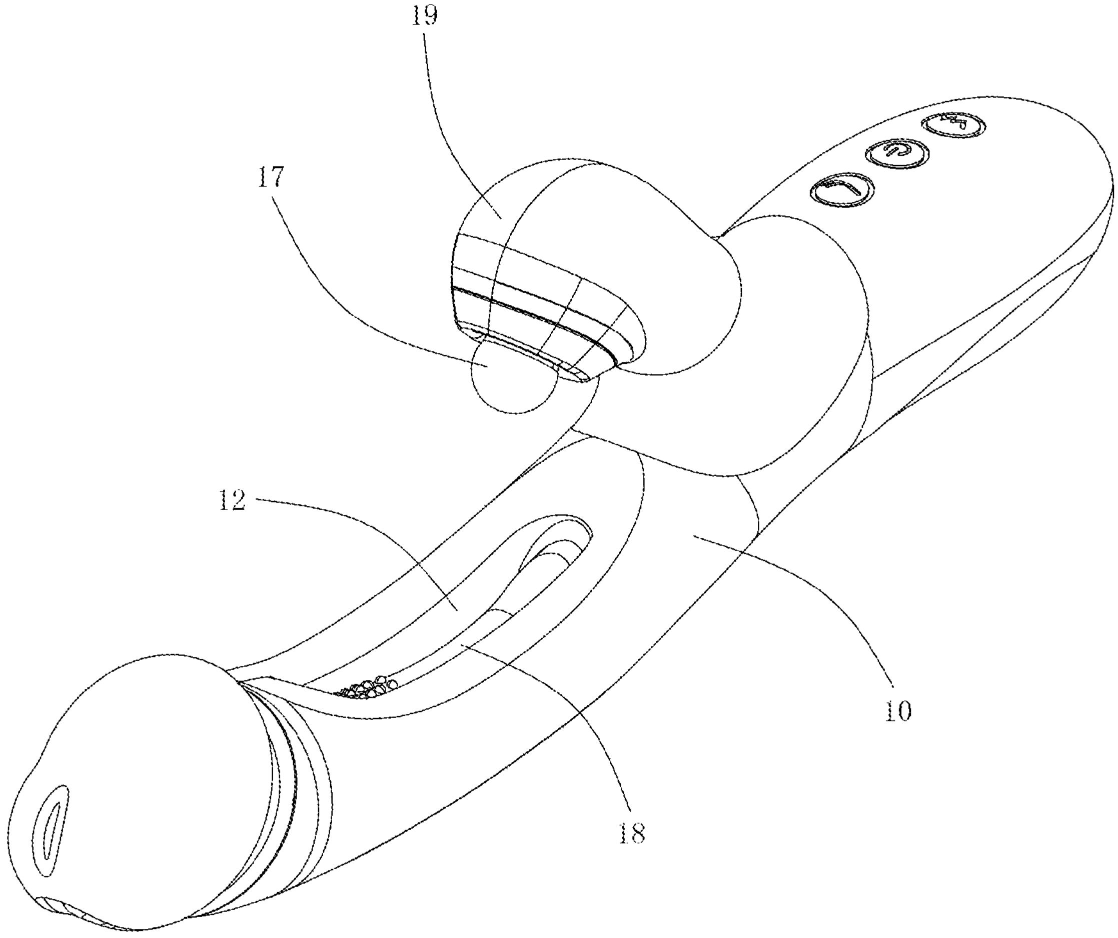
FIG. 10 is an isometric, assembled view of a massage device according to a second embodiment of the present application.
Figure 11:
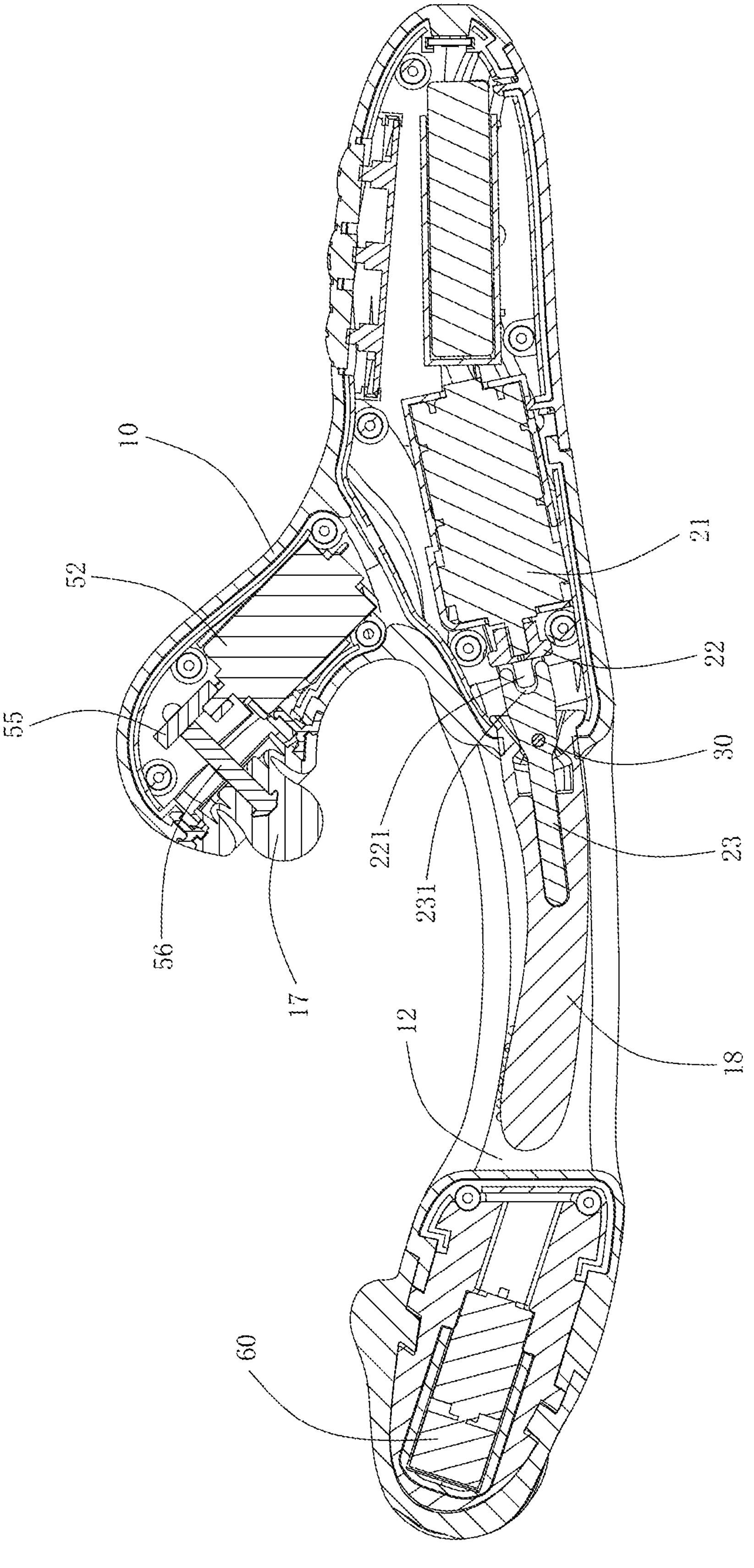
FIG. 11 is a cross sectional view of the massage device of FIG. 10.
Figure 12:
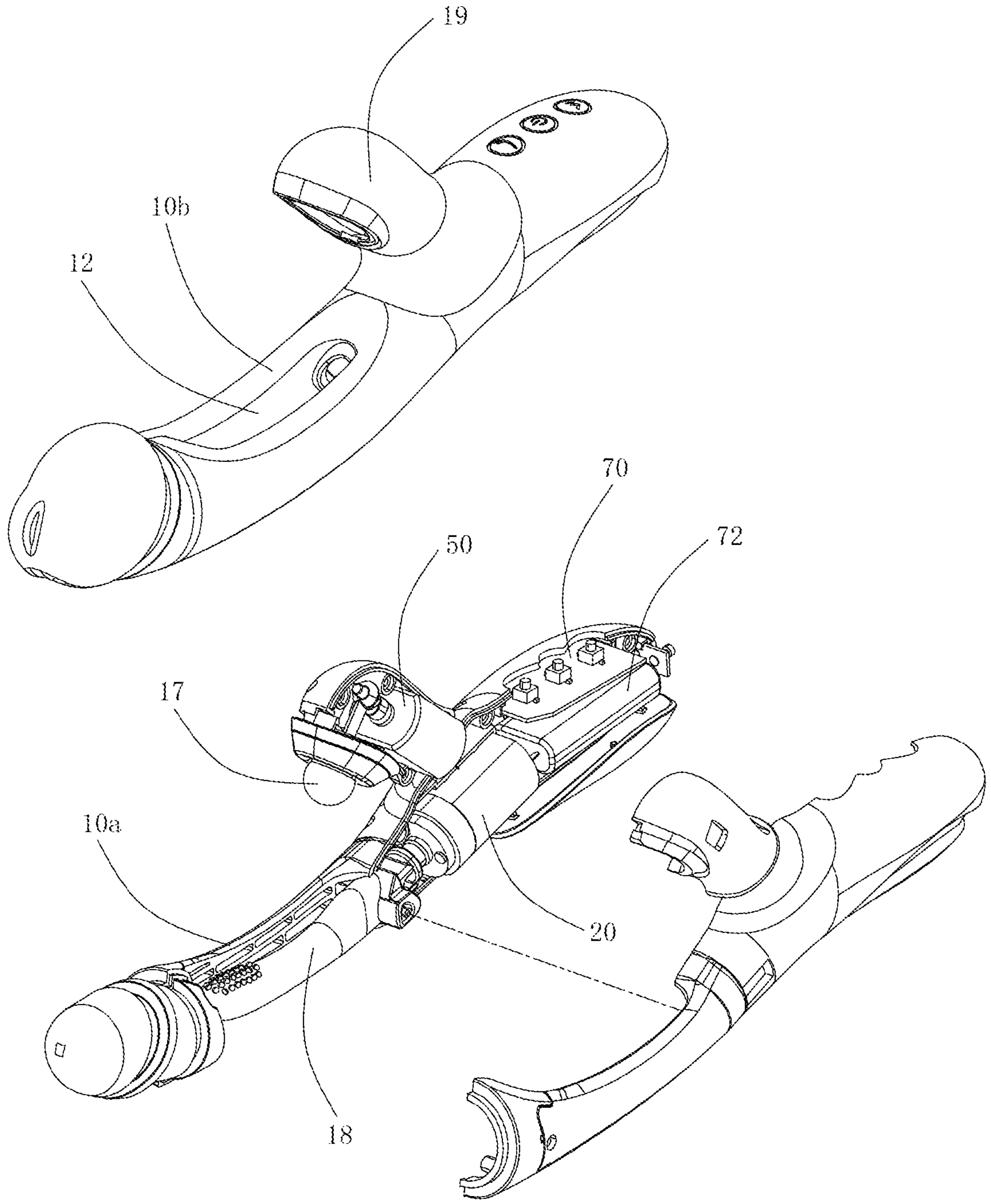
FIG. 12 is an exploded view of the massage module of FIG. 10.

Referring FIGS. 10-12, a massage device according to a second embodiment of the present application is shown. In this embodiment, the massage device includes a shell 10 and first, second and third massage modules 20, 50, 60 accommodated in the shell 10, wherein the first massage module 20 extends into a first massage portion 18 at a middle of the shell 10, the second massage module 50 is provided in a second massage portion 19 of the shell 10 extending towards an upper side of the first massage portion 18, and the third massage module 60 is provided at a front end of the shell 10. The first and third massage modules 20, 60 are generally constructed as those of the first embodiment, and the difference between this embodiment the first embodiment is mainly in the second massage module 50.

Figure 13:
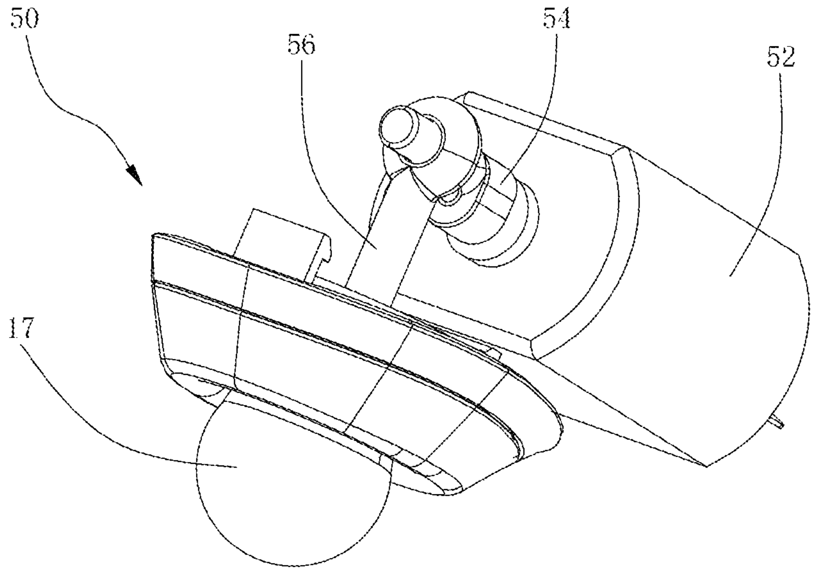
FIG. 13 is an isometric, assembled view of a second massage module of the massage device of FIG. 10.
Figure 14:
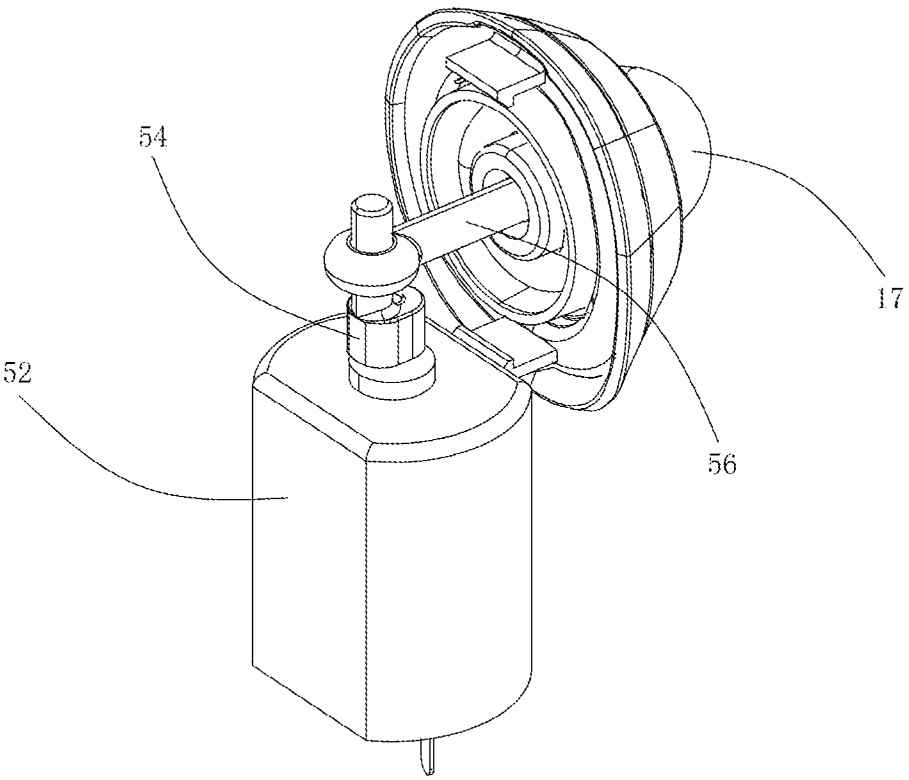
FIG. 14 shows the second massage module of FIG. 13 from another aspect.
Figure 15:
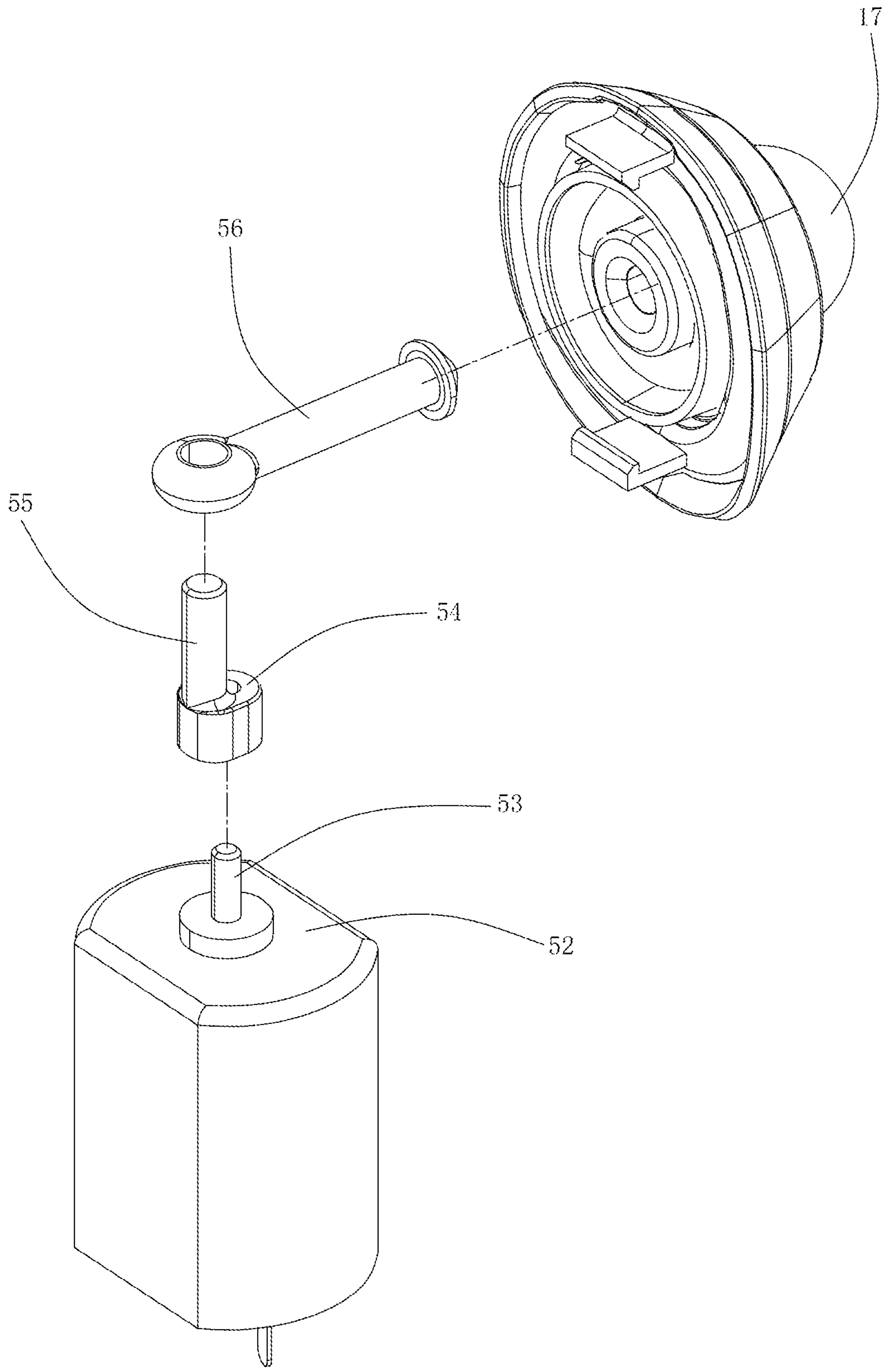
FIG. 15 is an exploded view of the second massage module of FIG. 14.
Figure 16:
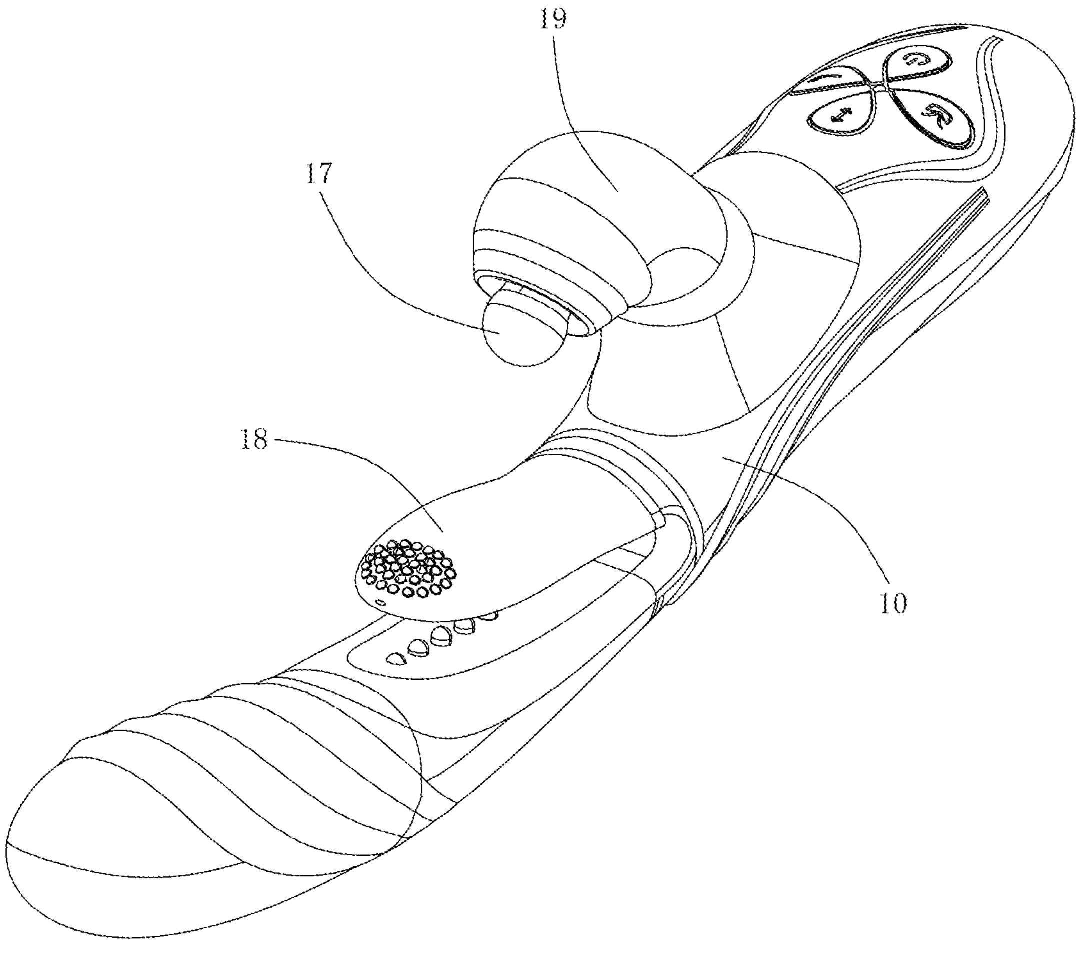
FIG. 16 is an isometric, assembled view of a massage device according to a third embodiment of the present application.
Figure 17:
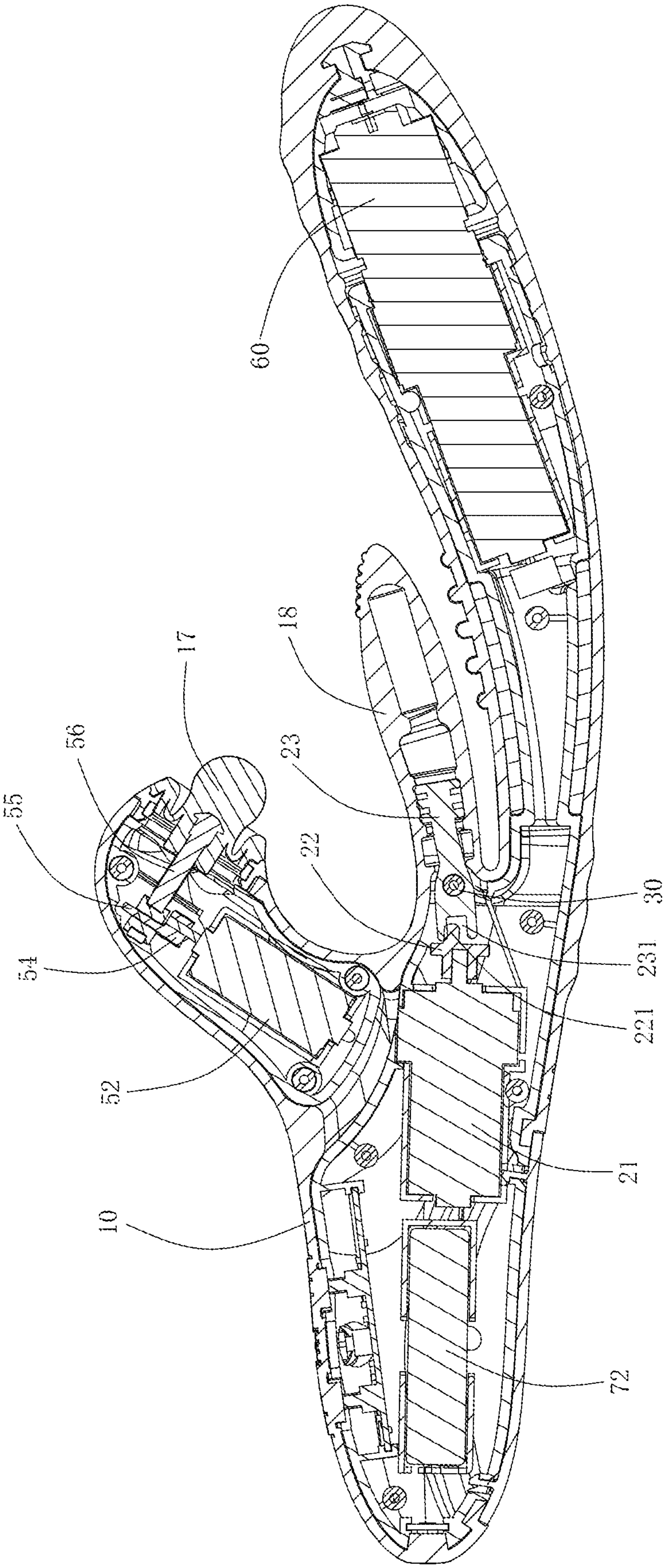
FIG. 17 is a cross sectional view of the massage device of FIG. 16.
Figure 18:
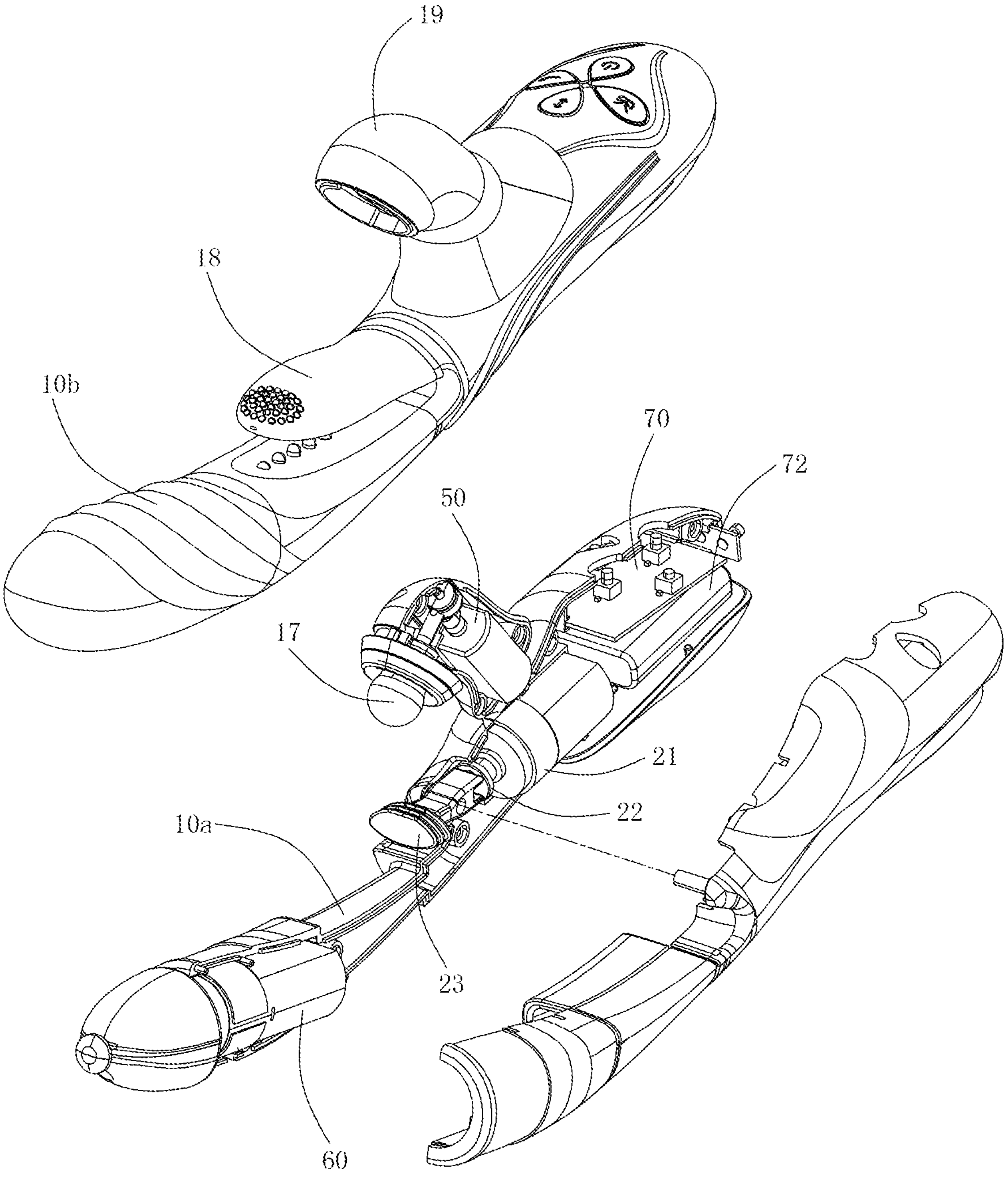
FIG. 18 is an exploded view of the massage module of FIG. 16.
Figure 19:
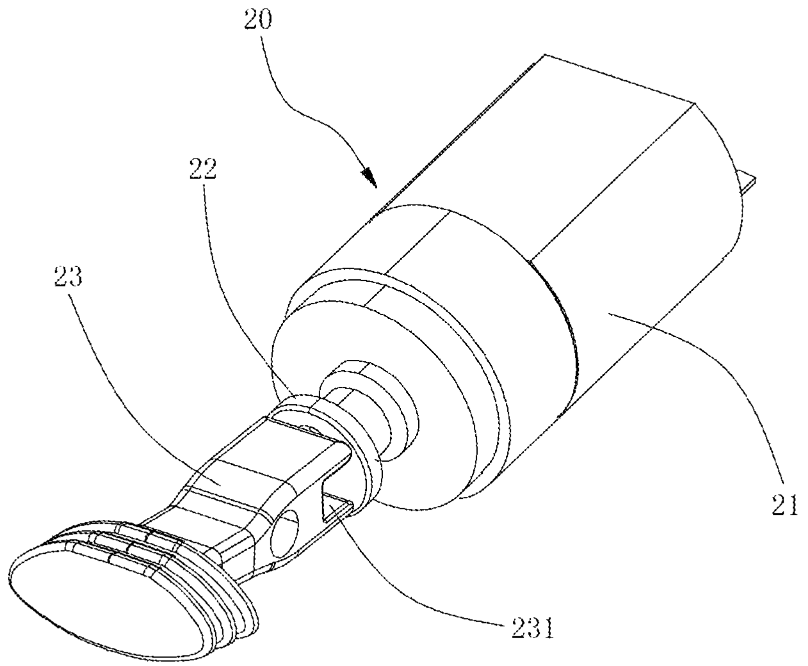
FIG. 19 is a schematic view of a first massage module of the massage device of FIG. 16.
Figure 20:
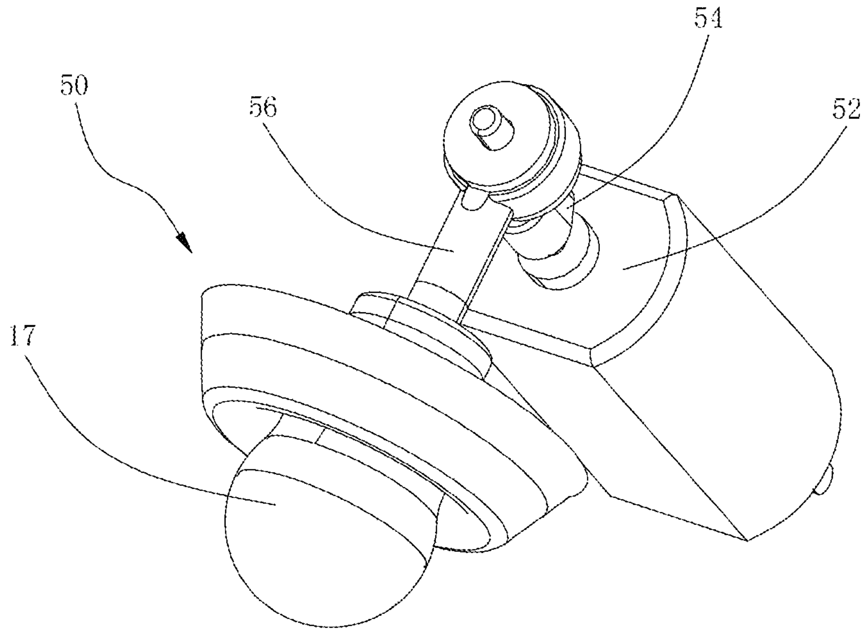
FIG. 20 is a schematic view of a second massage module of the massage device of FIG. 16.

As shown in FIG. 13 to FIG. 15, the second massage module 50 of this embodiment includes a second motor 52 with an output shaft 53, an eccentric wheel 54 connected to the output shaft 53 of the second motor 52, and a massage rod 56 connected to the eccentric wheel 54. The eccentric wheel 54 has a connecting rod 55 extending out therefrom, and the connecting rod 55 is parallel to the output shaft 53 of the second motor 52. The massage rod 56 is generally perpendicular to the connecting rod 55, with one end thereof rotatably mounted around the connecting rod 55 and another end thereof embedded into the second massage portion 19 of the shell 10.

In this embodiment, a massage cap 17 is coupled to a distal end of the second massage portion 19, and the another end of the massage rod 56 is fixedly embedded in the massage cap 17. The massage cap 17 is generally dome-shaped, and may be formed separately and then assembled to the second massage portion 19, or may be integrally formed with the second massage portion 19 as one piece. That is, the massage cap 17 may be regarded as a portion of the second massage portion 19 of the shell 10.

During operation of the second massage module 50, rotation of the second motor 52 is converted into revolving of the massage rod 56 round the output shaft 53, and then converted into linear reciprocating motion of the massage rod 56 and the massage cap 17 along an axial direction of the massage rod 56, thereby hitting the clitoris to enhance stimulation effect when the massage device is used in the vagina. During axial movement of the massage rod 56, a relative rotation is generated between the massage rod 56 and the connecting rod 55.

As shown in FIGS. 16-20, a massage device according to a third embodiment is provided. In this embodiment, the massage device includes a shell 10 and first, second and third massage modules 20, 50, 60 accommodated in the shell 10.

The shell 10 has a first massage portion 18 and a second massage portion 19 extending out therefrom, wherein the first massage portion 18 extends generally straight from a rear end of the shell 10 towards an upper side of a middle portion of the shell 10, and the second massage portion 19 extends curvedly from the rear end of the shell 10 towards an upper side of the first massage portion 18. In this embodiment, the first massage portion 18 is located at the upper outer side of the middle of the shell 10, and thus there is no moving space in the shell 10 and a larger space for mounting the third massage module 60 may be obtained.

The first massage module 20 is mounted in the shell 10, with a swinging bar 23 thereof engaged into the first massage portion 18; the second massage module 50 is arranged in the second massage portion 19, with a massage rod 56 thereof embedded into a massage cap 17 coupled to a distal end of the second massage portion 19; and the third massage module 60 is accommodated in the front end of the shell 10 and may be a vibration motor. The first massage module 20 is generally constructed as that in the second embodiment, and drives the first massage portion 18 to swing up and down. The second massage module 50 is generally constructed as that in the second embodiment, and drives the massage cap 17 of the shell 10 to do linear reciprocating motion.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A massage device, comprising:

a shell configured to be inserted into a vagina of a human body along an insertion direction, the shell is elongated and comprising a front end portion, a rear end portion, a top exterior surface and a bottom exterior surface, wherein a length of the shell extends from a front end portion to a rear end portion;

a first massage portion is elongated and is provided at a middle of the shell along the insertion direction, the first massage portion extends from the shell towards a front side of the massage device, the first massage portion comprising a first end and a second end opposite to the first end in the insertion direction, the first end of the first massage portion being connected to the shell, the second end of the first massage portion being spaced from the shell and configured as a massage head of the massage device, the first massage portion comprising a bottom exterior surface and a top exterior surface extending along a length of the first massage portion between the first end and the second end of the first massage portion, the bottom exterior surface of the first massage portion is configured to face the top exterior surface of the shell, and wherein the shell extends from the first end of the first massage portion to the front side of the massage device;

a first massage module mounted in the shell, and the first massage module comprising a first motor and a swinging bar, the swinging bar being rotatably connected to the shell by a pivot extending along a lateral direction of the shell, one end of the swinging bar being connected to the first motor in a transmission way, and another end of the swinging bar extending into the first massage portion of the shell; and a branch extends curvedly from the first end of the first massage portion to an upper side of the first massage portion by curvedly extending away from the shell and towards the front side of the massage device, a second motor is arranged in the branch configured to stimulate a clitoris of the human body, the branch comprising a free end and a bottom exterior surface, the bottom exterior surface of the branch faces the top exterior surface of the first massage portion, wherein the swinging bar is swingable about the pivot under the driving of the first motor to cause the first massage portion to travel between the upper exterior surface of the shell and the bottom exterior of the branch by causing the bottom exterior surface of the first massage portion to approach the top exterior surface of the shell while the top exterior surface of the first massage portion moves away from the bottom exterior surface of the branch and to cause the top exterior surface of the first massage portion to approach the bottom exterior surface of the branch while the bottom exterior surface of the first massage portion moves away from the top exterior surface of the shell, and whereby, in use, when the front end portion of the shell is inserted in the vagina, the branch is configured to stimulate the clitoris of the human body while the first massage portion is configured to slap the vaginal wall of the vagina.

2. The massage device according to claim 1, the middle of the shell is located between the front end portion and the rear end portion, the first end of the first massage portion is connected to the rear end portion of the shell, and the massage head extends away from the rear end portion of the shell along the insertion direction, and wherein the massage head of the first massage portion is substantially parallel to the middle of the shell and spaced from the middle of the shell in a swinging direction of the first massage portion.

3. The massage device according to claim 1, wherein a plurality of bulges is provided on the massage head of the first massage portion.

4. The massage device according to claim 1, wherein the first massage module further comprises an eccentric wheel connected between the first motor and the swinging bar, a driving rod extends out from a periphery of the eccentric wheel, and a sliding groove is defined in an end of the swinging bar for accommodating the driving rod therein, wherein the sliding groove is elongated in a direction parallel to the pivot.

5. The massage device according to claim 1, wherein the branch is a second massage portion that is provided at the middle of the shell, and a second massage module comprising the second motor, the second massage module is mounted in the second massage portion.

6. The massage device according to claim 5, wherein the second massage module comprises the second motor and a massage rod, the massage rod comprises one end connected to the second motor in a transmission way and another end embedded into a distal end portion of the second massage portion, wherein the massage rod is movable along an axial direction thereof under the driving of the second motor to allow the second massage portion and the massage rod to hit the clitoris.

7. The massage device according to claim 6, wherein the second massage module further comprises an eccentric wheel connected between the second motor and the massage rod, and a connecting rod extends out from a periphery of the eccentric wheel and is rotatably connected to the one end of the massage rod eccentric wheel.

8. The massage device according to claim 3, wherein the distal end portion of the second massage portion comprises an annular-shaped massage cap and the annular-shaped massage cap comprises a dome-shaped massage portion is provided at a central portion of the annular-shaped massage cap, the dome-shaped massage portion protrudes partly outwards from the massage cap and faces towards the first massage portion, and the another end of the massage rod is fixedly embedded in configured to reciprocate the dome-shaped massage portion.

9. The massage device according to claim 1, wherein the second motor is a vibration motor.

10. The massage device according to claim 1, wherein a vibration motor is provided inside the front end portion of the shell.

11. The massage device according to claim 1, wherein a battery and a circuit board are provided inside the rear end portion of the shell and connected to the first motor electrically.

* * * * *